United States Patent Office 3,184,506
Patented May 18, 1965

3,184,506
PREPARATION OF CARBOXYLIC ACID
CHLORIDES
Stuart H. Parker, Riverside Gardens, Wilmington, and
Dennis D. Rudy, Newark, Del., assignors to E. I. du
Pont de Nemours and Company, Wilmington, Del., a
corporation of Delaware
No Drawing. Filed July 19, 1961, Ser. No. 125,080
8 Claims. (Cl. 260—544)

This invention relates to a process for the preparation of carboxylic acid chlorides and more particularly to a dimethylformamide catalyzed process for reacting carboxylic acids with phosgene under particular reaction and operating conditions.

In recent years carboxylic acid chlorides, such as the chlorides of iso and terephthalic acids, have become very important chemicals since they are used commercially for the synthesis of newly developed fibers and as intermediates in the pigment, pharmaceutical, adhesive and rubber industries. Heretofore these carboxylic acid chlorides have been prepared by batch procedures from the corresponding carboxylic acids wherein these acids have been treated with phosgene in the presence of a formamide derivative. All attempts to operate these prior art procedures by a continuous procedure have ended in complete failure because of the difficulties arising from tar formation. It would, therefore, be highly desirable to provide a continuous economical process for the preparation of carboxylic acid chlorides.

It is an object of the present invention to provide a novel process for the preparation of carboxylic acid chlorides. It is a further object to provide a continuous process for the preparation of carboxylic acid chlorides by the reaction of the corresponding carboxylic acids with phosgene in the presence of dimethylformamide. Other objects will appear hereinafter.

These and other objects of this invention are accomplished by a process, which can be operated in a continuous manner, which comprises converting an organic carboxylic acid to its corresponding carbonyl chloride by reaction with phosgene in the presence of dimethylformamide at a temperature in the range of 50 to 125° C., with the proviso that unreacted carboxylic acid is present at all times in the reaction zone and in the product stream leaving the reaction zone, there being present in the product stream an amount of unreacted carboxylic acid so as to provide at least one stoichiometric amount of acid for each mole of phosgene which is present.

The essence of the present invention resides in the significant discovery that a highly economical continuous process for the conversion of an organic carboxylic acid to its carbonyl chloride by reaction with phosgene using dimethylformamide as a catalyst can be carried out in an efficient manner when unreacted carboxylic acid is present at all times in the reaction zone and in the product stream leaving the reaction zone. Attempts to carry out the batch procedures of the prior art by a continuous mode of operation resulted in the accumulation of an insoluble tar which invariably blocked the bottom of the reactor, thus stopping the flow of materials through it and the outlet pipe. It was, therefore, very difficult to run these batch procedures on a continuous basis for more than very short intervals of time. The insoluble tar which accumulates is devoid of any catalytic activity in the reaction. It is believed that this tar is the thermal decomposition product of the initially formed reaction product of phosgene with dimethylformamide. Its formation, therefore, results in the loss of catalyst which would otherwise be available for recycle.

The kinetics involved in all of the pertinent reactions which take place in the formation of carboxylic acid chlorides from the corresponding acids were studied and the surprising fact was discovered that the reaction of dissolved phosgene with dimethylformamide is the slowest, and hence the rate-determining step, while the reaction of the catalytically active phosgene-dimethylformamide reaction product with the carboxylic acid with regeneration of the formamide proceeds at a much faster rate. Based on these reaction rates, it was concluded that the concentration of the thermally unstable, active catalyst species in the reaction mixture, which thermally decomposes to form an insoluble tar, could be kept at a tolerable minimum when the process is operated in such a manner that there is an excess of unreacted carboxylic acid present at all times and in all places where phosgene reacts with dimethylformamide to produce the active catalyst species. The phosgene-dimethylformamide reaction product will be hereinafter referred to as the "active catalyst species." Being highly reactive, this active catalyst species has, under the conditions of the present invention, an excellent opportunity to react rapidly with the available carboxylic acid before it accumulates and decomposes. In order to accomplish this and to provide an economical continuous process, the carboxylic acid must be present at all times in the reaction zone and in the product stream leaving the reaction zone. The unreacted carboxylic acid in the product stream leaving the reaction zone should be present in an amount so as to provide at least one stoichiometric equivalent of acid per mole of phosgene which may be present. This amount of acid can be readily determined and will vary with the type of acid, e.g., one mole of a monocarboxylic acid per mole of phosgene or one half mole of a dicarboxylic acid per mole of phosgene.

Any excess of unreacted carboxylic acid remaining after formation of the carbonyl chloride also serves as an absorbent for that part of the dimethylformamide catalyst which is dissolved in the portion of the reaction mixture which is not recycled in the process of this invention. This absorption explains the observed fact that the total loss of catalyst in any particular cycle amounts to only a few percent of the total catalyst present in the system when the carboxylic acid is converted to the corresponding carbonyl chloride according to the process of the present invention.

The formation of carboxylic acid chlorides according to the present invention may be illustrated by the following equation using isophthalic acid

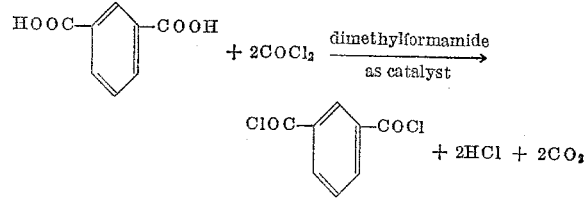

Any carboxylic acid which can be converted to its acid chloride by reaction with phosgene with dimethylformamide as a catalyst may be employed in the present invention. The acids which undergo this reaction with phosgene are the $C_8$–$C_{16}$ alkane carboxylic acids, the $C_3$–$C_8$ alkane dicarboxylic acids, the $C_5$–$C_6$ cycloalkane dicarboxylic acids and aromatic carboxylic acids containing 1 to 3 carboxylic groups in which any substituent of the aromatic acid is selected from the group consisting of methyl, methoxy, chloro and nitro groups. Representative acids within this definition which may be used are: isophthalic acid, terephthalic acid, 5-chloroisophthalic acid, alphanaphthoic acid, benzoic acid, p-nitrobenzoic acid, p-toluic acid, p-anisic acid, o-methoxybenzoic acid, trimesic acid, glutaric acid, adipic acid, azelaic acid, sebacic acid, cyclohexane-1,4-dicarboxylic acid, cyclopentane dicarboxylic acid, octanoic acid, lauric acid, and stearic acid.

In carrying out the process the molten carbonyl chloride which is formed may serve as the sole reaction solvent; however, inert solvents can be employed provided that these inert solvents contain no groups which react with the carbonyl chlorides; are miscible with the carbonyl chloride and with dimethylformamide; preferably dissolve little or no carboxylic acid at the operating conditions; and have physical properties, such as boiling points, which are sufficiently different from those of the carbonyl chlorides to permit ready separation by physical means. Suitable inert solvents include aliphatic hydrocarbons such as hexane or heptane, and aromatic hydrocarbons or halogenated hydrocarbons such as xylene and mono or dichlorobenzene. Their use, however, decreases the production capacity in a reactor and auxiliary equipment of limited dimensions and it entails the collection of an extra distillation cut. Their use is, of course, necessary when the carbonyl chloride melts higher than the desired reaction temperature. Use of these solvents is desirable when, at the desired reaction temperature, the side reaction of acid with acid chloride to form anhydride is massive.

The amount of dimethylformamide catalyst employed in the process of the present invention can be varied within very wide limits in the range of 0.05 to 5.0 weight percent based on the solvent. The preferred range is 0.1 to 1.0 weight percent. The reaction rate is dependent, among other things, on the mole fraction of the catalyst in the solvent.

The temperature for carrying out the continuous process of the present invention can be varied within the range of about 50 to 125° C. The preferred range is 60° to 100° C. Below 60° C. the reaction rate becomes inconveniently slow and above 100° C. side reactions, especially reaction of the carbonyl chloride with the carboxylic acid to form the corresponding carboxylic acid anhydride, become increasingly dominant as the temperature is raised, particularly when the carboxylic acid chloride is used as the reaction solvent. The retention time required in the reaction zone for the conversion of the carboxylic acid at a given rate will therefore be governed by the choice of temperature, catalyst concentration, volume of solvent, phosgene feed rate and the amount of phosgene which can be tolerated in the gaseous by-products of the reaction. This choice, in turn, will be governed by such considerations as the economics of the process, the required level of production and the preferred type of reactor.

In a preferred representative procedure for the continuous process of the present invention, isophthalic acid is converted to the corresponding carbonyl chloride using a dimethylformamide concentration of 0.3 weight percent based on the solvent with a retention time in the range of 10 to 40 minutes per cycle. The yield of isophthaloyl chloride based on the isophthalic acid consumed ranges from about 85 to 95 percent of theory. The conversion per cycle of carboxylic acid to carbonyl chloride can be made as low as is economically practicable; however, the upper limit on conversion per cycle is dictated by the requirement that an adequate amount of the carboxylic acid must remain unreacted at all times and in all places in the reaction zone. The carboxylic acid content of the reactor feed-stock can be varied. The upper limit is determined by mechanical practicability. The lower limit is governed in the above requirement. In the case of isophthalic acid, the preferred concentration in the feed-stock is in the range of 10 to 30 weight percent based on the solvent. In order to establish and maintain a balanced system, it is necessary to adjust the quantity of the feed of total (fresh and recovered) carboxylic acid into the reaction zone in such manner as to be equivalent to the carbonyl chloride taken from the system for the final purification by distillation or by fractional recrystallization from a suitable solvent.

The particular manner in which the unreacted carboxylic acid is separated from the product stream leaving the reaction zone, and how the recovered acid is returned to it, is not in itself critical. It is, however, much preferred to make this phase of the process also a fully continuous one by employing, for instance, a porous filter tube, a shriver thickener, a cyclone, a centrifuge, or a settling device. If desired, the total product stream leaving the reactor may be collected, either before or after separating from it the unreacted acid, in a receiver which is changed at convenient intervals. While the latter is being filled, the contents of the first one can be worked up continuously by retaining a portion of the filtered crude reaction mass for purification while the rest is returned together with make-up dimethylformamide, fresh and recovered carboxylic acid, and also adding to it if required, the make-up amount of an inert diluent which may have been employed as solvent for the conversion of that particular carboxylic acid to its chloride.

As long as the fundamental reaction conditions defined above are maintained in the reaction zone, the choice of the equipment and operating details are not critical. A sieve-plate type, vertical reactor is preferred, but this invention is by no means restricted to the use of this particular design for the reactor. For example, a series of vessels provided with mechanical agitation and arranged in cascade can be used, also. The construction material must, of course, be resistant to the corrosion caused, particularly at elevated temperatures, by phosgene, hydrochloric acid formed in the reaction, the carbonyl chloride, and also the active catalyst species which is hydrolytically unstable. It is very important, therefore, to avoid at all times and in all places undue exposure of the reaction liquid and product stream to moisture.

When operating with a sieve-plate type reactor the utilization of phosgene can be raised to an unusually high level. The phosgene can be introduced into the lower end of such a reactor in a direction counter to the flow of the carboxylic acid stream. This provides a system where the lower regions of the reactor are the main reaction zones, while in the upper regions the phosgene remaining in the gaseous by-products evolved from the lower reaction regions is removed. Therefore, almost no phosgene need be wasted in the process, much in contrast to the prior art batch procedures where the use of a substantial excess of phosgene is required.

Instead of adding the solid and liquid reactants and the recycled portion of the reaction liquid to a separate feed vessel, as is illustrated in the examples, the upper part of the reactor itself can be used as a region in which the make-up acid and catalyst can be added together with additional solvent where required. The product stream leaving the bottom of the reactor can be continuously recycled back to the top of the reactor, and a side stream from this main stream can be taken such that a continuous and controlled flow of solids-free liquid can be withdrawn for purification. Fresh acid can be continuously fed at a controlled rate to the upper region of the reactor by means of a screw or belt-type conveyance from a storage hopper. Fresh dimethylformamide can be continuously fed from a storage vessel at a controlled rate to the upper region of the reactor by means of a metering pump. When the reaction medium is an inert solvent, the make-up requirements can be met by continuouly feeding from a storage vessel at a controlled rate to the upper region of the reactor by means of a metering pump. The process can also be operated within the scope of this invention when substantially more than the theoretically required quantity of phosgene is employed. The excess phosgene is allowed to escape in the effluent gases together with the liberated hydrochloric acid and carbon dioxide. It can be separated and returned to the reaction zone along with fresh phosgene.

The following examples will better illustrate the nature of the present invention; however, the invention is not intended to be limited to these examples. Parts are by weight unless otherwise indicated.

The reactor used in the examples consists of a vertical glass tube 60 inches in length, 2 inches internal diameter, wound on the outside with a Nichrome wire heating element. The tube is surrounded by a 4 inch internal diameter glass tube which serves as a thermal insulator.

Both ends of the reactor tube are flared such that by means of gaskets and metal clamping collars, similarly flared glass caps 3 inches in length can be attached to each end of the reactor tube in a leak-proof manner.

Three standard taper ground-glass joints are sealed into each cap. The joints on the cap on the top of the reactor provde (1) an inlet through which the acid, solvent and catalyst are fed, (2) an inlet for a thermometer, and (3) an exit for the gaseous by-products of the reaction. These are passed to a scrubber. The joints on the cap at the bottom of the reactor provide (1) an inlet through which the phosgene is fed as a finely-dispersed gas stream by means of a tube with a sintered glass tip which projects 2 inches up into the reactor, (2) an inlet for a thermometer, and (3) an exit for the product stream.

Inside the reactor tube a number of ¼ inch thick, flush fitting, circular polytetrafluoroethylene plates are placed. The plates are spaced in a predetermined pattern by means of 4 symmetrically placed ¼ inch diameter polytetrafluoroethylene-coated supporting rods which pass through each of the plates. Each plate is drilled with 18 ⅟₁₆-inch holes arranged in a symmetrical pattern. A ⅜-inch internal diameter glass tube, one per plate, passes through each of the plates. The lower ends of these tubes are bent through about 90° of arc.

In Examples 1, 5 such plates are used. They are spaced 6 inches apart with the bottom plate 1 inch above the lower reactor tube flange. With the 4 upper plates, the glass tube in each case projects 4 inches above the plate and 4 inches below the plate. With the bottom plate, the glass tube projects 4 inches above the plate and 3½ inches below the plate.

In Examples 2 to 7, 4 such plates are used. They are spaced 12 inches apart with the bottom plate 1 inch above the lower reactor tube flange. With the 3 upper plates, the glass tube in each case projects 4 inches above the plate and 10 inches below the plate. With the bottom plate, the glass tube projects 4 inches above the plate and 3½ inches below the plate.

In Examples 8, 9 and 10, 7 such plates are used. They are spaced 6 inches apart with the bottom plate 1 inch above the lower reactor tube flange. With the 6 upper plates, the glass tube in each case projects 4 inches above the plate and 4 inches below the plate. With the bottom plate, the glass tube projects 4 inches above the plate and 3½ inches below the plate.

*Example 1*

A mixture of 300 parts of isophthalic acid, 2700 parts of molten isophthaloyl chloride and 9 parts of dimethylformamide is fed continuously from a feed vessel at an average rate of 39.7 parts per minute to the top of the vertical reactor described above. The mixture passes continuously down the reactor to meet a counter-current of phosgene flowing continuously at an average rate of 4.6 parts per minute. The reactor is heated such that the average temperature of the reaction medium within the reactor is 88° C. The phosgene feed rate is such that isophthalic acid is present at all stages within the reactor and is present in stoichiometric excess in the liquid stream leaving the reactor.

The stream leaving the reactor is continuously filtered from isophthalic acid and the filtrate is continuously passed to a receiver. At convenient intervals of time the receiver is changed and 10 weight percent of the filtered crude reaction mass is retained for purification.

The remainder is returned to the feed vessel together with 0.04 part of fresh dimethylformamide per 100 parts of crude reaction product and 9.7 parts of isophthalic acid per 100 parts of crude reaction product, the acid consisting of that removed from the product stream in a previous cycle to gether with the required amount of fresh acid.

After 22 cycles made in this manner over approximately 870 minutes, 2846 parts of fresh isophthalic acid are fed to the reactor and 247.4 parts of unreacted acid are recovered. That is, 91.3 weight percent of the isophthalic acid is consumed. Throughout this run the average phosgene content of the gaseous by-products of the reaction is less than 1 volume percent.

The isophthaloyl chloride withdrawn has a boiling range of 142 to 144° C./13 mms. The distilled chloride has a freezing point of 42.9° C. which, within the limits of experimental error, is the same as that of the chloride introduced initially as reaction solvent.

Throughout the operation of the reactor for approximately 80 hours in a manner such that isophthalic acid is present in all stages of the reactor, and in the product stream, neither the reactor nor the product stream contain any of the black, water-soluble solid whose presence is indicative of thermal decomposition of the active catalyst species and which is obtained when there is no excess of acid present.

*Example 2*

A mixture of 300 parts of terephthalic acid, 2700 parts of monochlorobenzene and 9 parts of dimethylformamide is fed continuously from a feed vessel at an average rate of 36.9 parts/minute to the top of the vertical reactor described above. The mixture passes continuously down the reactor to meet a counter-current of phosgene flowing continuously up the reactor at an average rate of 4.3 parts/minute. The reactor is heated such that the average temperature of the reaction medium within the reactor is 95° C. The phosgene feed rate is such that terephthalic acid is present at all stages within the reactor and is present in stoichiometric excess in the liquid stream leaving the reactor. The liquid stream leaving the reactor is continuously filtered from terephthalic acid and the filtrate is continuously passed to a receiver.

When the mixture in the feed vessel is at a low level (i.e., the end of cycle 1), the content of the receiver is returned to the feed vessel together with 10 parts of terephthalic acid and 0.1 part of fresh dimethylformamide per 100 parts of crude reaction product. This transfer is made without interrupting the flow and rates of flow of materials entering and leaving the reactor. The mixture is fed to the reactor in the manner described above.

When the mixture in the feed vessel is again at a low level (i.e., the end of cycle 2), the following procedure is used at the end of this and subsequent cycles:

Let the crude reaction product collected in the receiver be W parts; 0.5W parts are retained for purification and 0.5W parts are returned to the feed vessel together with 0.4W parts of monochlorobenzene, 0.0009W parts of fresh dimethylformamide and 0.09W parts of terephthalic acid, the acid consisting of that recovered from the product stream in a previous cycle together with the required amount of fresh acid. This transfer of materials to the feed vessel at the end of each cycle is made without interrupting the flow and rates of flow of materials entering and leaving the reactor. When operating in this manner for 8 cycles over approximately 225 minutes from startup, 534.3 parts of fresh terephthalic acid are fed to the reactor, and 137.7 parts of unreacted terephthalic acid are present in the reaction system at the end of this time. Throughout this run, the average phosgene content of the gaseous by-products of the reaction is 5.3 volume percent.

The crude reaction product collected for purification is distilled at atmospheric pressure to remove the monochlorobenzene and dissolved gases. The residue is then distilled at reduced pressure to give 407 parts of terephthaloyl chloride, B.P. 118° C./2 mms., freezing point 80.4° C. The yield of chloride is 84.0% of theory, based on the acid consumed.

Example 3

A mixture of 300 parts of cyclohexane-1,4-dicarboxylic acid (melting point 168–170° C.), 2700 parts of xylene and 9 parts of dimethylformamide is fed continuously from a feed vessel at an average rate of 42.0 parts/minute to the top of the vertical reactor described above. The mixture passes continuously down the reactor to meet a counter-current of phosgene flowing continuously up the reactor at an average rate of 4.3 parts/minute. The reactor is heated such that the average temperature of the reaction medium within the reactor is 89° C. The phosgene feed rate is such that cyclohexane-1,4 dicarboxylic acid is present at all stages within the reactor and is present in stoichiometric excess in the liquid stream leaving the reactor. The liquid stream leaving the reactor is continuously filtered from cyclohexane-1,4 dicarboxylic acid and the filtrate is continuously passed to a receiver.

When the mixture in the feed vessel is at a low level (i.e., the end of cycle 1), the content of the receiver is returned to the feed vessel together with 10 parts of cyclohexane-1,4 dicarboxylic acid and 0.1 part of fresh dimethylformamide per 100 parts of crude reaction product. This transfer is made without interrupting the flow, and rates of flow, of materials to and from the reactor. The mixture is fed to the reactor in the manner described above.

When the mixture in the feed vessel is again at a low level (i.e., the end of cycle 2), the following procedure is used at the end of this and subsequent cycles:

Let the crude reaction product collected in the receiver be W parts; 0.5W parts are retained for purification and 0.5W parts are returned to the feed vessel together with 0.4W parts of xylene, 0.0009W parts of fresh dimethyformamide and 0.09W parts of cyclohexane-1,4 dicarboxylic acid, the acid consisting of that removed from the product stream in a previous cycle together with the required amount of fresh acid. This transfer of materials to the feed vessel at the end of each cycle is made without interrupting the flow and rates of flow of materials to and from the reactor.

When operating in this manner for 6 cycles over approximately 190 minutes from start-up, 68.2 parts of fresh acid are fed to the reactor, and 223.9 parts of unreacted acid are present in the reaction system at the end of this time. Throughout this run the average phosgene content of the gaseous by-products of the reaction is 12.8 volume per cent.

The crude reaction product collected for purification is distilled at atmospheric pressure to remove the xylene and dissolved gases. The residue is distilled at reduced pressure to give 493 parts of cyclohexane-1,4 dicarbonyl chloride, B.P. 131–135° C./5 mms., freezing point 46.1° C. The yield of chloride is 88.6% of theory, based on the acid consumed.

Example 4

A mixture of 100 parts of alpha-naphthoic acid, 2900 parts of monochlorobenzene and 2.9 parts of dimethylformamide is fed at an average rate of 72.9 parts/minute to the top of the vertical reactor described above. The mixture passes continuously down the reactor to meet a counter-current of phosgene flowing continuously up the reactor at an average rate of 3.7 parts/minute. The reactor is heated such that the average temperature of the reaction medium within the reactor is 60° C. The phosgene feed rate is such that alpha-naphthoic acid is present at all stages within the reactor and is present in stoichiometric excess in the liquid stream leaving the reactor. The liquid stream leaving the reactor is continuously filtered from alpha-naphthoic acid and the filtrate is continuously passed to a receiver.

When the mixture in the feed vessel is at a low level (i.e., the end of cycle 1), the content of the receiver is returned to the feed vessel together with 3.35 parts of alpha-naphthoic acid and 0.025 part of fresh dimethylformamide per 100 parts of crude reaction product. This transfer is made without interrupting the flow and rates of flow of materials to and from the reactor. The mixture is fed to the reactor in the manner described above.

When the mixture in the feed vessel is again at a low level (i.e., the end of cycle 2), the following procedure is used at the end of this and subsequent cycles:

Let the crude reaction product collected in the receiver be W parts; 0.5W parts are retained for purification and 0.5W parts are returned to the feed vessel together with 0.47W parts of monochlorobenzene, 0.00024W parts of fresh dimethylformamide and 0.033W parts of alpha-naphthoic acid, the acid consisting of that recovered from the product stream in a previous cycle together with the required amount of fresh acid. This transfer of materials to the feed vessel at the end of each cycle is made without interrupting the flow and rates of flow of materials to and from the reactor.

When operating in this manner for 3 cycles over approximately 85 minutes from start-up, 212.4 parts of fresh acid are fed to the reactor, and 7.2 parts of unreacted acid are present in the reaction system at the end of this time. Throughout this run the average phosgene content of the gaseous by-products of the reaction is 6.5 volume percent.

The crude reaction product collected for purification is cooled to —10° C. when 66 parts of crude alpha-naphthoic acid crystallize out and are filtered off. The impure acid has a melting point of 150 to 158° C. and a melting point of 154 to 158° C. when mixed with a known sample of alpha-naphthoic acid of melting point 160 to 161° C. The filtered solution is distilled at atmospheric pressure to remove the monochlorobenzene and dissolved gases and the residue is distilled at reduced pressure to give 142.4 parts of alpha-napthoyl chloride, B.P. 133 to 134° C./5 mms. The yield of chloride is 92.4% of theory, based on the acid consumed.

Example 5

A mixture of 600 parts of adipic acid, 2400 parts of n-heptane and 15.8 parts of dimethylformamide is fed continuously from a feed vessel at an average rate of 42.45 parts/minute to the top of the vertical reactor decribed above. The mixture passes continuously down the reactor to meet a counter-current of phosgene flowing continuously up the reactor at an average rate of 8.5 parts/minute. The reactor is heated such that the average temperature of the reaction medium within the reactor is 59° C. The phosgene feed rate is such that adipic acid is present at all stages within the reactor and is present in stoichiometric excess in the liquid stream leaving the reactor. The liquid stream leaving the reactor is continuously filtered from adipic acid and the filtrate is continuously passed to a receiver.

When the mixture in the feed vessel is at a low level (i.e., the end of cycle 1), the content of the receiver is returned to the feed vessel together with 25 parts of adipic acid and 0.2 part of fresh dimethylformamide per 100 parts of crude reaction product. This transfer is made without interrupting the flow and rates of flow of materials to and from the reactor. The mixture is fed to the reactor in the manner described above.

When the mixture in the feed vessel is again at a low level (i.e., the end of cycle 2), the following procedure is used at the end of this and subsequent cycles:

Let the crude reaction product collected in the receiver be W parts; 0.5W parts are retained for purification and 0.5W parts are returned to the feed vessel together with 0.32W parts of n-heptane, 0.0017W parts of fresh dimethylformamide and 0.22W parts of adipic acid, the acid consisting of that recovered from the product stream in a previous cycle together with the required amount of fresh acid. This transfer of materials to the feed vessel at the end of each cycle is made without interrupting the flow and rates of flow of materials to and from the reactor.

When operating in this manner for 5 cycles over approximately 170 minutes from start-up, 950.5 parts of fresh acid are fed to the reactor, and 304.7 parts of unreacted acid are present in the reaction system at the end of this time. Throughout this run the average phosgene content of the gaseous by-products of the reaction is 12.6 volume percent.

The crude reaction product collected for purification is distilled at atmospheric pressure to remove the n-heptane and dissolved gases. The residue is then distilled at reduced pressure to give 494 parts of adipyl chloride, B.P. 110 to 115° C./9 mms. The yield of chloride is 61.1% of theory based on the acid consumed.

*Example 6*

A mixture of 150 parts of 5-chloroisophthalic acid, 2850 parts of monochlorobenzene and 5.7 parts of dimethylformamide is fed continuously from a feed vessel at an average rate of 57.4 parts/minute to the top of the vertical reactor described above. The mixture passes continuously down the reactor to meet a counter-current of phosgene flowing continuously up the reactor at an average rate of 6.6 parts/minute. The reactor is heated such that the average temperature of the reaction medium within the reactor is 71° C. The phosgene feed rate is such that 5-chloroisophthalic acid is present at all stages within the reactor and is present in stoichiometric excess in the liquid stream leaving the reactor. The liquid stream leaving the reactor is continuously filtered from 5-chloroisophthalic acid and the filtrate is continuously passed to a receiver.

When the mixture in the feed vessel is at a low level (i.e., the end of cycle 1), the content of the receiver is returned to the feed vessel together with 5.3 parts of 5-chloroisophthalic acid and 0.05 part of fresh dimethylformamide per 100 parts of crude reaction product. This transfer is made without interrupting the flow and rates of flow of materials to and from the reactor. The mixture is fed to the reactor in the manner described above.

When the reaction mixture in the feed vessel is again at a low level (i.e., the end of cycle 2), the following procedure is used at the end of this and subsequent cycles:

Let the crude reaction product collected in the receiver be W parts; 0.5W parts are retained for purification and 0.5W parts are returned to the feed vessel together with 0.45W part of monochlorobenzene, 0.00048W part of fresh dimethylformamide and 0.05W part of 5-chloroisophthalic acid, the acid consisting of that recovered from the product stream in a previous cycle together with the required amount of fresh acid. This transfer of materials to the feed vessel at the end of each cycle is made without interrupting the flow and rates of flow of materials to and from the reactor.

When operating in this manner for 3 cycles over approximately 95 minutes from start-up, 279 parts of fresh 5-chloroisophthalic acid are fed to the reactor, and 48 parts of unreacted acid are present in the reaction system at the end of this time. Throughout this run the average phosgene content of the gaseous by-products of the reaction is 5.4 volume percent.

The crude reaction product collected for purification is distilled at atmospheric pressure to remove the monochlorobenzene and dissolved gases. The residue is distilled at reduced pressure to give 234 parts of 5-chloroisophthaloyl chloride, B.P. 122 to 126° C./4 mms. The yield of chloride is 85.5% of theory, based on the acid consumed.

*Example 7*

A mixture of 225 parts of p-nitrobenzoic acid, 2775 parts of o-dichlorobenzene and 6.95 parts of dimethylformamide is fed continuously from a feed vessel at an average rate of 68.3 parts/minute to the top of the vertical reactor described above. The mixture passes continuously down the reactor to meet a counter-current of phosgene flowing continuously up the reactor at an average rate of 5.3 parts/minute. The reactor is heated such that the average temperature of the reaction medium within the reactor is 78° C. The phosgene feed rate is such that p-nitrobenzoic acid is present at all stages within the reactor and is present in stoichiometric excess in the liquid stream leaving the reactor. The liquid stream leaving the reactor is continuously filtered from p-nitrobenzoic acid and the filtrate is continuously passed to a receiver.

When the mixture in the feed vessel is at a low level (i.e., the end of cycle 1), the content of the receiver is returned to the feed vessel together with 7.5 parts of p-nitrobenzoic acid and 0.07 part of fresh dimethylformamide per 100 parts of crude reaction product. This transfer is made without interrupting the flow and rates of flow of materials to and from the reactor. The mixture is fed to the reactor in the manner described above.

When the mixture in the feed vessel is again at a low level (i.e., the end of cycle 2), the following procedure is used at the end of this and subsequent cycles:

Let the crude reaction produce collected in the receiver be W parts; 0.5W part is retained for purification and 0.5W part is returned to the feed vessel together with 0.43W part of o-dichlorobenzene, 0.0007W part of fresh dimethylformamide and 0.075W part of p-nitrobenzoic acid, the acid consisting of that recovered from the product stream in a previous cycle together with the required amount of fresh acid. This transfer of materials to the feed vessel at the end of each cycle is made without interrupting the flow and rates of flow of materials to and from the reactor.

When operating in this manner for 11 cycles over approximately 215 minutes from start-up, 1092.3 parts of fresh p-nitrobenzoic acid are fed to the reactor, and 170.8 parts of unreacted acid are present in the reaction system at the end of this time. Throughout this run the average phosgene content of the gaseous by-products of the reaction is 7.4 volume percent.

The crude reaction product collected for purification is distilled at atmospheric pressure to remove the o-dichlorobenzene and dissolved gases. The residue is then distilled at reduced pressure to give 922 parts of p-nitrobenzoyl chloride, B.P. 128 to 148° C./4 mms., freezing point 71.6° C. The yield of chloride is 90.2% of theory, based on the acid consumed.

*Example 8*

A mixture of 300 parts of isophathalic acid, 2700 parts of molten isophthaloyl chloride and 9 parts of dimethylformamide is fed continuously from a feed vessel at an average rate of 49 parts per minute to the top of the vertical reactor described above. The mixture passes continuously down the reactor to meet a counter-current of phosgene flowing continuously at an average rate which is varied from 5.7 to 9.3 parts per minute. The reactor is heated such that the average temperature of the reaction medium within the reactor is 95° C. The phosgene feed rates are such that isophthalic acid is not always present at all stages within the reactor and is not always present in the liquid stream leaving the reactor. The number of stages at which isophthalic acid is present is inversely related to the phosgene feed rate.

The liquid in the lower reaction stages, at which no isophthalic acid is present, becomes progressively darker with time and solid, black, water-soluble catalyst thermal decomposition products appear in these stages and in the liquid stream leaving the reactor.

After operating in this manner for approximately 270 minutes from start-up, the phosgene flow is stopped and the liquid is drained from the reactor. The lower stage plates are covered with black, water-soluble solid in layers which vary from approximately ⅛ to ¼ inch in thickness.

Example 9

A mixture of 300 parts of isophthalic acid, 2700 parts of molten isophthaloyl chloride and 18 parts of dimethylformamide is fed continuously from a feed vessel at an average rate of 50 parts per minute to the top of the vertical reactor described above. The mixture passes continuously down the reactor to meet a counter-current of phosgene flowing continuously at an average rate which is varied from 6.4 to 8.1 parts per minute. The reactor is heated such that the average temperature of the reaction medium within the reactor is 95° C. The phosgene feed rates are such that isophthalic acid is not always present at all stages within the reactor and is not always present in the liquid stream leaving the reactor. The number of stages at which isophthalic acid is present is inversely related to the phosgene feed rate.

The liquid in the lower reaction stages, at which no isophthalic acid is present, becomes progressively darker with time and solid, black, water-soluble catalyst thermal decomposition products appear in these stages and in the liquid stream leaving the reactor.

After operating in this manner for approximately 280 minutes from start-up, the phosgene flow is stopped and the liquid is drained from the reactor. The lower stage plates are covered with black, water-soluble solid in layers which vary from approximately ½ to ¾ inch in thickness.

Throughout this run the average phosgene content of the gaseous by-products of the reaction varied from 1.2 to 4.9 volume percent.

Example 10

A mixture of 300 parts of isophthalic acid, 2700 parts of molten isophthaloyl chloride and 27 parts of dimethylformamide is fed continuously from a feed vessel at an average rate of 43 parts per minute to the top of the vertical reactor described above. The mixture passes continuously down the reactor to meet a counter-current of phosgene flowing continuously at an average rate which is varied from 6.1 to 7.7 parts per minute. The reactor is heated such that the average temperature of the reaction medium within the reactor is 95° C. The phosgene feed rates are such that isophthalic acid is not always present at all stages within the reactor and is not always present in the liquid stream leaving the reactor. The number of stages at which isophthalic acid is present is inversely related to the phosgene feed rate.

The liquid in the lower reaction stages, at which no isophthalic acid is present, becomes progressively darker with time and solid, black, water-soluble catalyst thermal decomposition products appear in these stages and in the liquid stream leaving the reactor.

After operating in this manner for approximately 240 minutes from start-up, further operation becomes virtually impossible because the lower stages are choked with the black solid.

Throughout this run the average phosgene content of the gaseous by-products of the reaction varied from 1.1 to 2.9 volume percent.

As many widely different embodiments of this invention may be made without departing from the spirit and scope thereof, it is to be understood that this invention is not limited to the specific embodiments thereof except as defined in the appended claims.

What is claimed is:

1. In the continuous process for converting an organic carboxylic acid to its corresponding carbonyl chloride by reaction with phosgene in the presence of from about 0.05 to 5 weight percent of dimethylformamide based on the reaction solvent and at a temperature in the range of 50° C. to 125° C., wherein said organic carboxylic acid is selected from the group consisting of $C_8$–$C_{16}$ alkane carboxylic acid, $C_3$–$C_8$ alkane dicarboxylic acid, $C_5$–$C_6$ cycloalkane dicarboxylic acid and an aromatic carboxylic acid containing 1 to 3 carboxylic groups in which any substituent of the aromatic acid is selected from the group consisting of methyl, methoxy, chloro and nitro, the improvement of having unreacted carboxylic acid present at all times in the reaction zone and in the product stream leaving the reaction zone.

2. A process according to claim 1 in which the carboxylic acid is isophthalic acid.

3. A process according to claim 1 in which the carboxylic acid is terephthalic acid.

4. A process according to claim 1 in which the carboxylic acid is para-nitrobenzoic acid.

5. A process according to claim 1 in which the carboxylic acid is adipic acid.

6. A process according to claim 1 in which the carboxylic acid is cyclohexane-1,4-dicarboxylic acid.

7. A process according to claim 1 wherein the dimethylformamide is present in an amount ranging from about 0.1 to 1.0 weight percent based on the reaction solvent and the reaction is carried out at a temperature of from about 60 to 100° C.

8. The process according to claim 1 wherein said phosgene is introduced into the reaction zone in a direction counter to the flow of said carboxylic acid and dimethylformamide.

References Cited by the Examiner
FOREIGN PATENTS 581,615   8/59   Canada.
851,684  10/60   Great Britain.

LORRAINE A. WEINBERGER, *Acting Primary Examiner.*

LEON ZITVER, *Examiner.*